US006923846B2

(12) United States Patent
Nelson et al.

(10) Patent No.: US 6,923,846 B2
(45) Date of Patent: Aug. 2, 2005

(54) METHOD OF PREPARING COMPOSITE GAS SEPARATION MEMBRANES FROM PERFLUOROPOLYMERS

(75) Inventors: Joyce Katz Nelson, Lexington, MA (US); Benjamin Bikson, Brookline, MA (US); James Timothy Macheras, Quincy, MA (US)

(73) Assignee: L' Air Liquide—Societe Anonyme à Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 65 days.

(21) Appl. No.: 10/371,934

(22) Filed: Feb. 21, 2003

(65) Prior Publication Data

US 2003/0126988 A1 Jul. 10, 2003

Related U.S. Application Data

(63) Continuation of application No. 09/839,920, filed on Apr. 20, 2001, now Pat. No. 6,540,813.
(60) Provisional application No. 60/237,342, filed on Sep. 29, 2000, and provisional application No. 60/211,072, filed on Jun. 13, 2000.

(51) Int. Cl.⁷ .................. B01D 53/22; B01D 71/06; B01D 69/12
(52) U.S. Cl. .................. 95/53; 95/45; 95/54; 96/10; 96/13; 96/14; 55/524; 55/DIG. 5
(58) Field of Search .................. 95/45, 53, 54; 96/8, 10, 13, 14; 55/524, DIG. 5

(56) References Cited

U.S. PATENT DOCUMENTS

| 3,755,034 A | 8/1973 | Mahon et al. |
| 4,467,001 A | 8/1984 | Coplan et al. |
| 4,533,741 A | 8/1985 | Squire |
| 4,565,855 A | 1/1986 | Anderson et al. |
| 4,606,740 A | * 8/1986 | Kulprathipanja .......... 95/47 |
| 4,754,009 A | 6/1988 | Squire |
| 4,781,834 A | 11/1988 | Sekino et al. |
| 4,806,189 A | 2/1989 | Kraus et al. |

(Continued)

FOREIGN PATENT DOCUMENTS

| EP | 0649 676 A1 | 4/1995 |
| EP | 0719 581 A2 | 7/1996 |
| WO | WO 90/15662 | 12/1990 |
| WO | WO 98/12255 | 3/1998 |
| WO | WO 98/13124 | 4/1998 |
| WO | WO 98/53894 | 12/1998 |
| WO | WO 00/61267 | 10/2000 |

OTHER PUBLICATIONS

Cabasso, I., "Hollow Fiber Membranes," *Kirk Othmer Encyclopedia Chem. Tech.*, 12, Third Ed., pp. 492–517 (1980).
Rezac, M., et al. "Preparation of Polymer–Ceramic Composite Membranes with Thin Defect–Free Separating Layers," *Journal of Applied Polymer Science*, 46:1297–1938 (1992).

(Continued)

*Primary Examiner*—Robert H. Spitzer

(57) ABSTRACT

A method for fabricating a composite membrane includes coating a substrate, such as, for example, an asymmetrical porous hollow fiber substrate, with a solution which includes a perfluorinated polymer and a perfluorinated solvent. Prior to coating, the substrate is impregnated with an impregnation fluid which is immiscible with the perfluorinated solvent. The method of the invention further includes removing the perfluorinated solvent and the impregnation fluid. A composite membrane includes a porous asymmetric hollow fiber substrate having an outer surface coated with a perfluoropolymer coating. Separation devices which include composite membranes and methods of separating a fluid mixture into a fraction enriched in a first component and a fraction depleted in that component also are described.

18 Claims, 5 Drawing Sheets

U.S. PATENT DOCUMENTS

| | | | |
|---|---|---|---|
| 4,840,819 A | | 6/1989 | Williams et al. |
| 4,881,955 A | | 11/1989 | Bikson et al. |
| 4,900,626 A | * | 2/1990 | Fabre .............................. 96/10 |
| 4,990,165 A | * | 2/1991 | Bikson et al. .................. 96/10 |
| 5,026,479 A | | 6/1991 | Bikson et al. |
| 5,051,113 A | | 9/1991 | Nemser |
| 5,051,114 A | | 9/1991 | Nemser et al. |
| 5,085,776 A | * | 2/1992 | Blume et al. .......... 210/500.27 |
| 5,116,650 A | | 5/1992 | Bowser |
| 5,147,417 A | * | 9/1992 | Nemser ......................... 95/54 |
| 5,181,940 A | | 1/1993 | Bikson et al. |
| 5,213,689 A | | 5/1993 | Kafchinski et al. |
| 5,281,255 A | | 1/1994 | Toy et al. |
| 5,288,304 A | | 2/1994 | Koros et al. |
| 5,320,754 A | | 6/1994 | Kohn et al. |
| 5,356,459 A | * | 10/1994 | Bikson et al. .................. 95/54 |
| 5,526,641 A | | 6/1996 | Sekar et al. |
| 5,636,619 A | | 6/1997 | Poola et al. |
| 5,646,223 A | | 7/1997 | Navarrini et al. |
| 5,647,894 A | * | 7/1997 | Ohara et al. ................... 96/13 |
| 5,649,517 A | | 7/1997 | Poola et al. |
| 5,674,629 A | * | 10/1997 | Avrillon ................. 428/473.5 |
| 5,678,526 A | | 10/1997 | Cullen et al. |
| 5,702,601 A | | 12/1997 | Bikson et al. |
| 5,779,763 A | | 7/1998 | Pinnau et al. |
| 5,837,033 A | | 11/1998 | Giglia et al. |
| 5,868,992 A | | 2/1999 | Roman |
| 5,871,680 A | | 2/1999 | Macheras et al. |
| 5,876,604 A | | 3/1999 | Nemser et al. |
| 5,897,729 A | | 4/1999 | Bikson et al. |
| 5,902,747 A | | 5/1999 | Nemser et al. |
| 5,914,154 A | | 6/1999 | Nemser |
| 5,960,777 A | | 10/1999 | Nemser et al. |
| 6,271,319 B1 | | 8/2001 | Baker et al. |
| 6,316,684 B1 | | 11/2001 | Pinnau et al. |
| 6,361,582 B1 | | 3/2002 | Pinnau et al. |
| 6,361,583 B1 | | 3/2002 | Pinnau et al. |
| 6,406,517 B1 | | 6/2002 | Avery et al. |
| 6,414,202 B1 | | 7/2002 | Baker et al. |
| 6,540,813 B2 | * | 4/2003 | Nelson et al. .................. 95/53 |
| 2002/0014154 A1 | | 2/2002 | Witzko et al. |
| 2002/0065383 A1 | | 5/2002 | Maccone et al. |

OTHER PUBLICATIONS

Arcella, V.,"A study on a perfluoropolymer purification and its application to membrane formation," *Journal of Membrane Science* 163:203–209 (1999).

Alentiev, A.Y., et al., "High Transport Parameters and Free Volume of Perfluorodioxole Copolymers," *Journal of Membrane Science*, 126:123–132 (1997).

Buck, W.H. and Resnick, P.R., "Properties of Amorphous-Fluoropolymers Based on 2,2–Bistrifluoromethyl–4,5–Difluoro–1,3–Dioxole," *183$^{rd}$ Meeting of the Electrochemical Society, Honolulu, Hawaii, May 17, 1993*.

Gordano, A., et al., "Hydrophobic Membranes of Tetrafluoroethylene and 2,2,4 Trifluoro 5 Trifluorometoxy 1,3 Dioxole," *Korean Membrane Journal*, 1:50–58 (1999).

Hill, A.J., et al., "Physical Aging of High Permeability Membrane Polymers," *Polymeric Materials Science and Engineering*, 81:526–527 (1999).

Pinnau, I. and Toy, T.G., "Gas and Vapor Transport Properties of Amorphous Perfluorinated Copolymer Membranes Based on 2,2–Bistrifluoromethyl–4,5–Difluoro–1,3–Dioxole/ Tetrafluoroethylene," *Journal of Membrane Science*, 109:125–133 (1996).

Shantarovich, V.P., et al., "Position Annibilation Lifetime Study of High and Low Free Volume Glassy Polymers: Effects of Free Volume Sizes on the Permeability and Permselectivity," *Macromolecules*, 33:7453–7466 (2000).

Singh, A., et al., "Gas Permeation and Vapor Sorption Properties of Ultrahigh Free Volume Glassy Polymers," *Proceedings, 9$^{th}$ Annual Meeting, North American Membrane Society, Baltimore, May 31–Jun. 4, 1997*.

Singh, A., et al., "Gas Sorption and Transport Properties and PALS Analysis of Poly(tetrafluoroethylene[TFE]–CO–2, 2–Bistrifluoromethyl–4,5–Difluoro–1,3–Dioxole [PDD])," *Proceedings of the American Chemical Society Division of Polymeric Materials: Science and Engineering*, 77:316–317 (1997).

Yampolskii, Y.P., et al., "Fluorine Containing Polymers—Materials for Gas Separating Membranes," *Polymer Preprints (ACS Division Polymer Chem)*, 39(2):884–885 (1998).

Attachment together with Appendices 1–8, 2002 in prior application, U.S. Appl. No. 09/839,920, filed Oct. 4, 2002.

* cited by examiner

METHOD OF PREPARING COMPOSITE GAS SEPARATION MEMBRANES FROM PERFLUOROPOLYMERS

RELATED APPLICATIONS

This application is a continuation of U.S. application Ser. No. 09/839,920, now U.S. Pat. No. 6,540,813 B2, which was filed on Apr. 20, 2001, which claims the benefit of U.S. Provisional Application No. 60/211,072, filed Jun. 13, 2000, and of U.S. Provisional Application No. 60/237,342, filed Sep. 29, 2000. The entire contents of these applications are incorporated herein by reference.

BACKGROUND OF THE INVENTION

Composite membranes capable of selectively permeating one component of a fluid mixture over the remaining components in the mixture generally include a thin layer or coating of a suitable semipermeable membrane material superimposed over a porous substrate. Generally, while the coating affects the separation characteristics of the composite membrane, the primary function of the substrate is to provide support for the coating positioned thereon. Common porous substrates are configured as flat-sheet membranes or as hollow fibers.

In commercial or industrial applications, composite membranes need to operate for extended periods with low incidence of failure. Furthermore, the membranes often must withstand foul or corrosive environments.

One method of preparing composite membranes is to coat a preformed porous substrate, such as a porous hollow fiber, with a dilute solution of a polymer in a solvent, followed by the removal of the solvent by drying. However, it is generally very difficult to produce defect-free thin-film composites with thicknesses of less than 1 micro meter (1 $\mu$m) by the solution coating process. Furthermore, it is generally recognized in the art that it is difficult to produce viable (substantially defect-free) high productivity composite membranes by solution coating of substrates having high surface porosity. In particular, in order to produce complete surface coverage, the coating solution must fully wet the substrate. Capillary forces in a fully wetted porous substrate, however, tend to draw the coating solution into the surface pores leading to an effective increase in separation layer thickness and to a decrease in membrane productivity. This is often referred to as occlusion of the pores by the coating solution.

Several processes for making composite membranes are known in the art.

U.S. Pat. No. 4,840,819, to Williams et al., discloses a process in which a dilute solution of permeable polymer is applied to a porous substrate having a controlled amount of liquid incorporated therein.

U.S. Pat. No. 4,806,189, to Kraus et al., discloses a process for producing a composite fluid separation membrane by in situ formation of a separation layer on a porous support wherein the pores of the support are pre-impregnated with a solvent.

U.S. Pat. No. 5,320,754, to Kohn et al., discloses preparation of composite membranes by applying perfluoroethers to the surface of a porous substrate prior to coating with a selective polymeric material.

U.S. Pat. No. 5,213,689, to Kafchinski et al., discloses a method of coating microporous polyolefin hollow fibers by wet spinning or by dry-wet spinning. Polyolefin hollow fibers are coated with SIXEF™-Durene polyimide containing perfluoro groups from the solvent NMP. The polyolefin hollow fiber is optionally pre-wetted with glycerine prior to coating.

M. Rezac et al. in the *Journal of Applied Polymer Science*, V46, p. 1927(1992), teach preparation of composite membranes from solutions of ultra-high molecular weight polymers. The authors suggest that improved membranes are formed when polymer chain dimensions of the coating material are larger than the surface pores of the porous support.

Several amorphous perfluoropolymers have been used as coating or membrane materials, including perfluoropolymers with high gas permeation characteristics.

U.S. Pat. No. 5,051,114, to Nemser et al., discloses amorphous perfluoro-2,2-dimethyl-1,3-dioxole based polymers that can be used for several separation and gas enrichment applications, including oxygen enrichment of air.

U.S. Pat. No. 4,754,009, to Squire, discloses a gas permeable material that contains passageways wherein the interior of the passageways is formed by solution coating of perfluoro-2,2-dimethyl-1,3-dioxole.

U.S. Pat. No. 5,876,604, to Nemser et al., discloses the preparation of composite perfluoro-2,2-dimethyl-1,3-dioxole membranes that can be used to add a gas to a liquid or to remove a gas from a liquid. The membranes exhibit resistance to fouling by liquids, and can be utilized for ozonolysis or oxygenation.

U.S. Pat. No. 5,914,154, to Nemser, discloses preparation of non-porous gas permeable membranes by flowing a dilute coating solution of perfluoropolymer through one side of a microporous substrate, until the desired thickness of coating polymer is built up; the solution is then removed and residual solvent is evaporated.

Existing processes for producing composite perfluoropolymer membranes result in relatively thick coating layers, believed to be due, at least in part, to intrusion of the coating layer into the porous support. The resulting composite gas separation perfluoropolymer membranes exhibit relatively low gas permeance.

Therefore, a need exists for high productivity composite membranes and processes for making them in which these problems are eliminated or reduced.

SUMMARY OF THE INVENTION

The invention generally is directed to composite membranes, devices including the composite membranes and to methods of producing the composite membranes. The invention also generally is directed to methods of separating a fluid mixture into a fraction enriched in a component and a fraction depleted in the component.

In one embodiment, the invention is directed to a composite membrane which includes a porous asymmetric hollow fiber substrate having a bore side and an outer surface and a perfluorinated polymer coating at the outer surface of the hollow fiber substrate. In another embodiment, the invention is directed to a composite membrane having an oxygen permeance of at least $1500 \times 10^{-6}$ cm$^3$(STP)/(cm$^2$ sec) (cmHg) and an oxygen/nitrogen gas separation factor of at least 2.1. In yet other embodiments, the composite membranes of the invention are employed in separation devices, also referred to herein as separation modules or separation cartridges.

The invention also is directed to a method of fabricating a composite membrane. The method includes impregnating a porous substrate, such as, for example, an asymmetrical porous hollow fiber substrate, with an impregnation fluid that is immiscible with a perfluorinated solvent. The impregnated substrate is coated with a solution which includes a perfluorinated polymer and the perfluorinated solvent. The method of the invention further includes removing the perfluorinated solvent and the impregnation fluid. Optionally, the impregnation fluid is at least partially removed from the impregnated porous substrate prior to coating.

The invention also is directed to a method for separating a fluid mixture into a fraction enriched in a first component and a fraction depleted in the first component. The method includes contacting the fluid mixture with a composite membrane, whereby the fraction enriched in the first component and the fraction depleted in the first component are generated by preferentially permeating a portion of the fluid mixture through the composite membrane. In a preferred embodiment of the invention, the composite membrane is formed by a process comprising impregnating a porous substrate, such as, for example, an asymmetrical porous hollow fiber substrate, with an impregnation fluid that is immiscible with a perfluorinated solvent; coating the impregnated substrate with a solution which includes a perfluorinated polymer and the perfluorinated solvent; and removing the perfluorinated solvent and the impregnation fluid. In another preferred embodiment, the fluid mixture is air, the fraction enriched in the first component is oxygen-enriched air and the fraction depleted in the first component is nitrogen enriched air. Nitrogen enriched air can be directed into the intake of an internal combustion engine.

The invention has numerous advantages. For example, the coating material can be selected independently of the substrate material and can be tailored towards a specific separation application. In addition, expensive membrane forming materials can be economically utilized as coating materials because only small amounts are required for the formation of the thin coating. Also, the morphology or structure of the coating can be decoupled and optimized independently from the morphology or structure of the substrate.

The process of the invention results in coatings that are both thin and substantially free of defects. The small surface pores characterizing the preferred substrates of the invention can advantageously support thin coating layers, while the larger pore structure underneath enhances the membrane productivity. The composite membranes of the invention exhibit improved gas permeation characteristics as compared to prior art membranes and have a gas separation factor which is close to the measured intrinsic gas separation factor of the coating material. Composite membranes of the invention wherein the coating is at an outer surface of an asymmetric hollow fiber substrate have an increased surface area available for separation processes.

The composite membranes of the invention can withstand foul environments, such as, for example exhaust fumes generated by combustion processes. The separation devices of the invention are characterized by high productivity per unit volume coupled with low permeate and feed side pressure drops and are thus suitable for commercial applications.

DETAILED DESCRIPTION OF THIS INVENTION

The features and other details of the invention, either as steps of the invention or as combination of parts of the invention, will now be more particularly described with reference to the accompanying drawings and pointed out in the claims. The same numeral present in different figures represents the same item or an equivalent item. It will be understood that the particular embodiments of the invention are shown by way of illustration and not as limitations of the invention. The principle feature of this invention may be employed in various embodiments without departing from the scope of the invention.

The invention is related to composite membranes, to devices including the composite membranes and to methods of producing the composite membranes. The invention also is related to methods for separating a fluid mixture into a fraction enriched in a first component and a fraction depleted in the first component.

Figure 1:
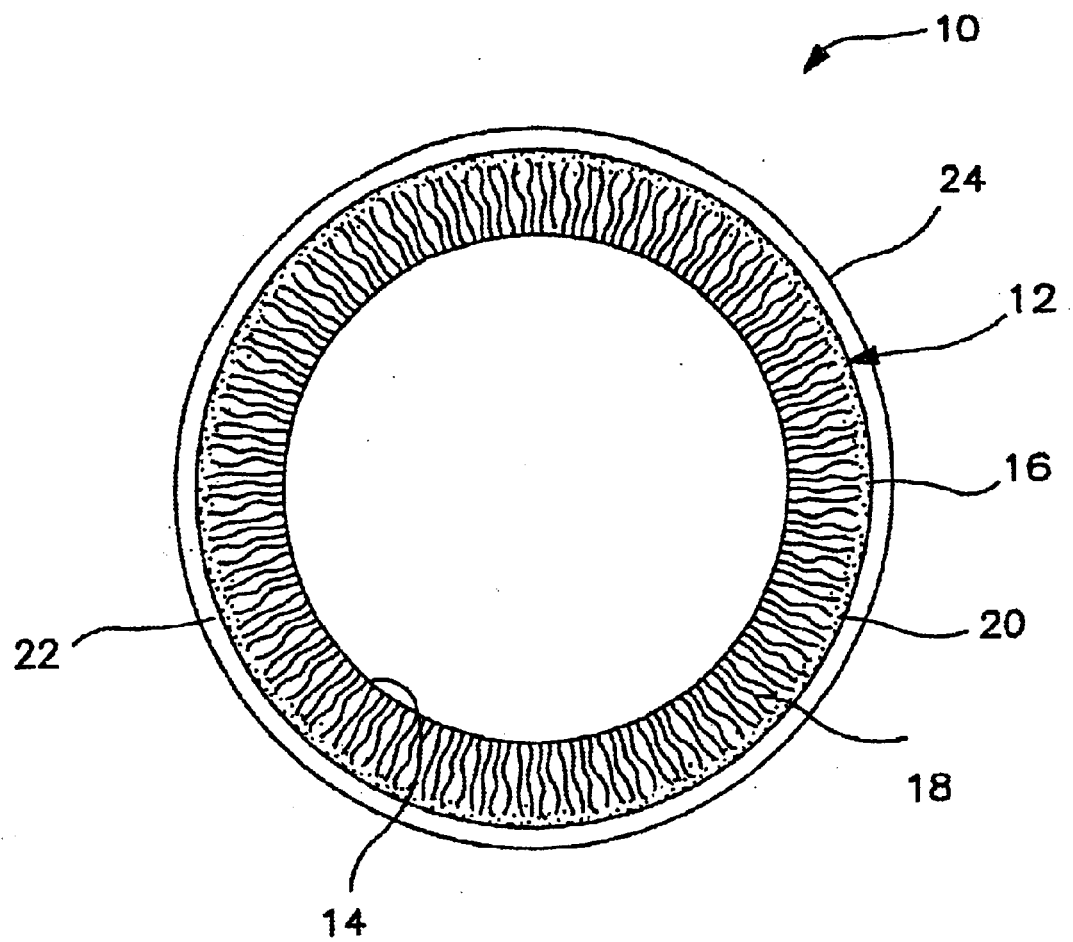
FIG. 1 is a cross-sectional view of a composite membrane of the invention.

A composite membrane of the invention is shown in FIG. 1. FIG. 1, not drawn to scale, is a cross sectional view of composite membrane 10 which includes substrate 12. In a preferred embodiment, substrate 12 is a porous hollow fiber. Other suitable substrates, such as, for example, a porous substrate in the form of flat sheet, tubular or in another form known in the art also can be employed.

Substrate 12 can be formed from organic or inorganic materials. Specific examples of suitable materials which can be employed to prepare substrate 12 include polysulfone, polyethersulfone, polyetherimide, polyvinylidene fluoride, polyacrylonitrile, polyimides, polyphenyleneoxide, polyolefins, such as polyethylene and polypropylene, and cellulose and its derivatives, such as cellulose acetates and ethylcellulose. Combinations of polymers including polymer blends, copolymers, terpolymers and others also can be employed. In one embodiment of the invention, substrate 12 is fabricated from an engineering polymeric material having a glass transition temperature above 90° C. In another embodiment of the invention, substrate 12 is fabricated from an engineering polymeric material having a glass transition temperature above 150° C.

Suitable techniques for preparing substrate 12 include wet spinning, dry spinning, dry-wet spinning, and other methods known in the art. Techniques useful in preparing porous substrate 12 are described, for example, by I. Cabasso in Hollow Fiber Membranes, *Kirk Othmer Encyclopedia Chem. Tech.*, 12, Third Ed., pp. 492–517 (1980). In a preferred embodiment of the invention, substrate 12 is prepared by a dry-wet spinning process such as disclosed in U.S. Pat. No. 5,181,940, issued on Jan. 26, 1993 to Bikson, et al. and U.S. Pat. No. 5,871,680 issued on Feb. 16, 1999 to Macheras, et al.

Generally, substrate 12 has an outer diameter which ranges between about 100 microns ($\mu$m) and about 2,000 $\mu$m. Substrates having an outside diameter between about 300 $\mu$m and about 1500 $\mu$m are preferred. Generally, the inner or bore diameter of substrate 12 is about 50 to 90 percent (%) of its outer diameter. Generally, substrate 12 has a wall thickness which typically ranges from about 30 $\mu$m to about 300 $\mu$m. A wall thickness no greater than about 200 $\mu$m is preferred.

Preferably, substrate 12 provides little resistance to gas flow. In one embodiment of the invention substrate 12 includes pores which occupy at least 25 percent (%), preferably at least 50% of the wall volume of substrate 12. The average cross-sectional diameter of the pores present in substrate 12 generally ranges from about 100 angstroms to about 200,000 angstroms. The terms "average cross-sectional diameter", "average diameter" and "pore diameter" are used herein interchangeably. Average diameters can be determined experimentally as known in the art, for example by adsorption techniques and scanning electron microscopy.

Substrates can be symmetrical, having essentially uniform pore structure characteristics, for instance, have uniform average cross sectional pore diameter, throughout the thickness of the substrate, or they can be asymmetrical. As used herein, the term "asymmetrical" refers to substrates that do not have the same pore structure, as determined, for instance by the average cross sectional pore diameter, throughout the substrate thickness.

In one embodiment the average pore diameter of the asymmetrical substrate is a gradient, progressing from one average pore diameter at a first side to a smaller average pore diameter at a second side.

In a preferred embodiment of the invention, substrate 12 is an asymmetric porous hollow fiber. Substrate 12 has bore side 14 and outer surface 16 and includes interior region 18, extending from bore side 14 and surface layer 20 at outer surface 16. Configurations in which interior region 18 extends through most of the wall thickness of substrate 12, combined with a relatively thin surface layer 20 are preferred. In one embodiment of the invention, the thickness of surface layer 20 is no greater than about 1,000 angstroms.

Both interior region 18 and surface layer 20 are porous. In a preferred embodiment of the invention, interior region 18 has different pore structure characteristics in comparison to the pore structure characteristics of surface layer 20. In another preferred embodiment, the average diameter of pores in interior region 18, referred to herein as interior pores, is at least about 10 times larger than that of pores in surface layer 20, referred to herein as surface pores.

In one embodiment of the invention, surface pores have an average diameter less than about 1,000 angstroms. In another embodiment of the invention, surface pores have an average diameter which is less than about 500 angstroms.

High levels of surface porosity are preferred. In one embodiment the ratio of the area occupied by surface pores to the total surface area is greater than $1\times10^2$. In another embodiment the ratio is greater than $3\times10^{-2}$. Surface pores having a narrow pore size distribution also are preferred.

Alternatively, or in addition to the features discussed above, substrate 12 can be characterized by its gas separation factor. The gas separation factor for two gases is defined as equal to the ratio of their respective gas permeances. The gas permeance is defined as the reduced permeability ($P_a/1$) of a membrane of thickness 1 for a gas or a gas mixture wherein the permeability for a given gas is the volume of gas at standard temperature and pressure (STP) which passes through a membrane per square centimeter of surface area, per second, for a partial pressure drop of 1 centimeter of mercury across the membrane per unit of thickness, and is expressed as $P=cm^3$ (STP) $cm/((cm^2)(sec)(cmHg))$.

In one embodiment of the invention, substrate 12 exhibits a helium permeance of above $1\times10^{-2}$ $cm^3$ (STP)/((cm$^2$)(sec)(cmHg)) and preferably above $1\times10^{-1}$ $cm^3$ (STP)/((cm$^2$)(sec)(cmHg)) combined with a He/N$_2$ separation factor that is at least 1.5 and preferably at least 1.9. The gas separation is believed to be primarily generated by the Knudsen flow in the surface pores.

Figure 2:
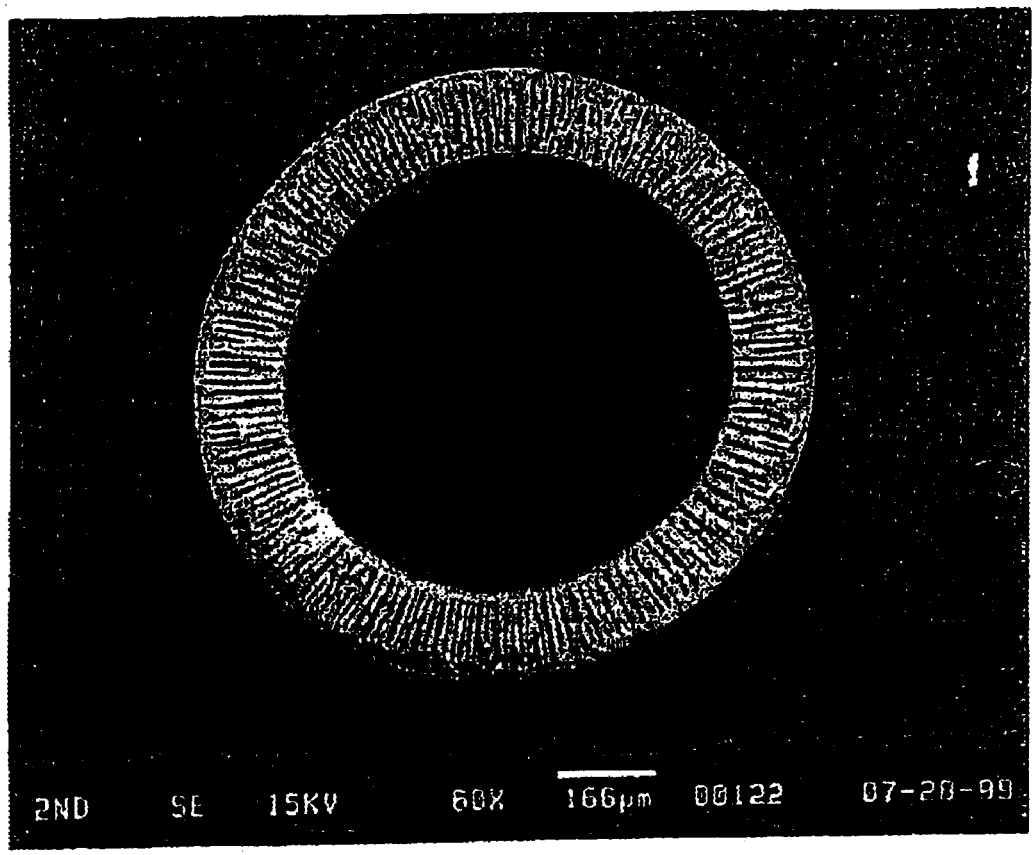
FIGS. 2 and 3 are scanning electron micrograph (SEM), at different magnifications, of a porous substrate employed in a composite membrane of the invention.
Figure 3:
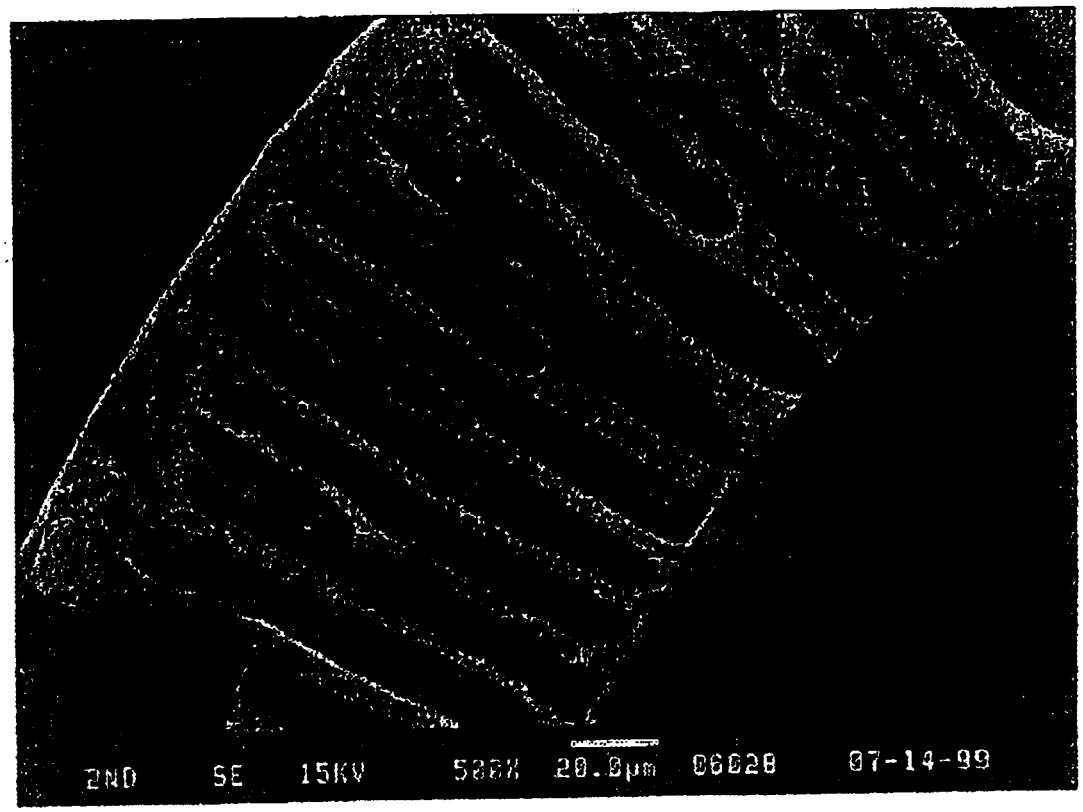

Scanning electron micrographs of a preferred substrate suitable in the fabrication of composite membrane 10 are shown in FIGS. 2 and 3.

Composite membrane 10, shown in FIG. 1, also includes coating 22 which has shell side 24. Coating 22 includes perfluoropolymers, also referred to herein as perfluorinated polymers. Amorphorous perfluorinated polymers are preferred. Also preferred are perfluoropolymers that exhibit gas permeability coefficients greater than 30 barrers, preferably greater than 100 barrers for the fast gas transported across the membrane.

Specific examples of suitable materials which can be employed in making coating 22 include amorphorous copolymers of perfluorinated dioxoles such as those described in U.S. Pat. No. 5,646,223, issued on Jul. 8, 1997 to Navarrini, et al. In one embodiment of the invention, the perfluoropolymer includes either a perfluoromethoxydioxole or a perfluoro-2,2-dimethyl-1,3-dioxole. The most preferred polymers are amorphous copolymers of perfluoro-2,2-dimethyl-1,3-dioxole (PDD) such as those described in U.S. Pat. Nos. 5,051,114 and 4,754,009. These include copolymers of PDD with at least one monomer selected from the group consisting of tetrafluoroethylene (TFE), perfluoromethyl vinyl ether, vinylidene fluoride and chlorotrifluoroethylene. In one most preferred embodiment the copolymer is a dipolymer of PDD and TFE wherein the copolymer contains 50–95 mole percent of PDD.

A composite membrane having a coating fabricated from perfluoro-2,2-dimethyl-1,3-dioxole copolymers supported on a polysulfone substrate is particularly preferred.

Preferably, coating 22 overlays outer surface 16 of substrate 12. In embodiments in which the asymmetric porous substrate has a shape other than that of a hollow fiber, the coating preferably overlays the surface having the smaller cross sectional average pore diameter.

A thin coating 22 is preferred. Generally, coating 22 is less than about 1 $\mu$m thick, preferably less than about 0.5 $\mu$m thick. In one embodiment of the invention, coating 22 is less than about 0.1 $\mu$m. Coatings that have a thickness between about 150 angstroms (Å; wherein 1 Å=$1\times10^{-10}$ m) and about 1000 angstroms are preferred. Particularly preferred are coatings that have a thickness between about 300 angstroms and about 500 angstroms.

Preferably, coating 22 also is substantially free of defects. By defects it is meant cracks, holes and other irregularities introduced by coating the perfluorinated polymer onto the substrate. By the term "substantially free of defects" it is meant that the gas separation factor of composite membrane 10 is at least about 75 percent of the measured gas separation factor of the perfluoro-polymer coating material. In a preferred embodiment, the gas separation factor of composite membrane 10 is at least about 85 percent of the measured gas separation factor of the perfluoro-polymer coating material. In another preferred embodiment, the gas separation factor of composite membrane 10 is at least about 92 percent of the measured gas separation factor of the perfluoropolymer coating material.

Figure 4:
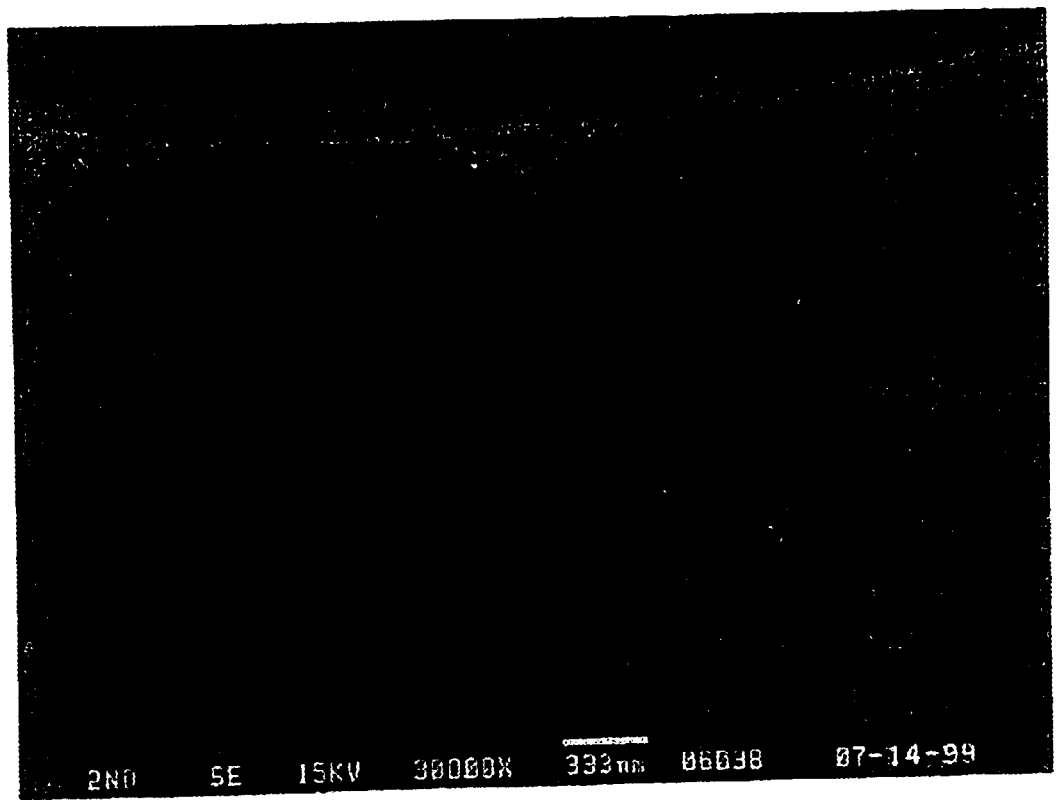
FIG. 4 is a scanning electron micrograph of a cross section of a composite membrane of the invention.

Alternatively or in addition to the features discussed above, the composite membranes of the invention can be characterized by their permeance and by their gas separation factor. In one embodiment of the invention, the oxygen permeance of the composite membranes of the invention is at least about $1500\times10^{-6}$ $cm^3$(STP)/((cm$^2$)(sec)(cmHg)) and preferably at least about $2000 \times 10^{-6}$ cm$^3$(STP)/((cm$^2$)(sec)(cmHg)). In another embodiment, the composite membrane exhibits an oxygen/nitrogen (O$_2$/N$_2$) gas separation factor of at least about 2.1, preferably at least 2.3. In a preferred embodiment the composite membranes of the invention have an O$_2$/N$_2$ gas separation factor between 2.3 and 2.5. A scanning electron micrograph of a composite membrane of the invention is shown in FIG. 4.

The invention also relates to a method for producing a composite membrane. The method includes impregnating a substrate, such as the substrates discussed above, with an impregnation fluid. The substrate can be symmetric or asymmetric. Planar configurations as well as symmetric hollow fiber substrates can be employed. In the case of hollow fiber substrates, impregnation can be at the bore side, the outer surface or both. Either or both surfaces of planar membranes can be impregnated.

Preferred impregnation fluids include liquids having a boiling temperature between about 60° C. and about 150° C. Suitable impregnation fluids include water and volatile liquids. Specific examples of suitable impregnation fluids include: C$_6$ to C$_{10}$ hydrocarbons, for instance, cyclohexane and heptane; alcohols, for instance, ethanol, isopropyl alcohol, n-butanol; and any combination thereof. Water is preferred.

The amount of the impregnation fluid present in the porous structure of the substrate can depend on the morphology of the porous substrate. As used herein, "level of impregnation" means the fraction of the pore volume occupied by the impregnation liquid. High levels of impregnation generally are preferred. However, excessive amounts of impregnation, wherein the surface of the porous substrate is completely covered by the impregnation liquid, can prevent the uniform wetting out of the porous support by the coating solution, further discussed below, and this in turn may result in non-uniform coating.

The amount of impregnation fluid present in the porous substrate can be controlled. In one embodiment of the invention, the impregnation fluid is at least partially removed from the porous substrate, for example by passing it through an oven. The oven temperature, oven air circulation rate and the speed with which the porous substrate is conveyed through the oven can be adjusted to control the uniformity and the level of impregnation. Other means suitable for removing, at least partially, the impregnation fluid from the porous substrate include evaporation in a vacuum chamber, passing a drying gas over the impregnated surface of the porous substrate and other means known in the art.

In one embodiment of the invention, impregnation of a porous substrate is an integral part in the fabrication process employed to produce the substrate. For example, porous hollow fiber substrates can be fabricated by a dry-wet spinning process such as disclosed in U.S. Pat. No. 5,181,940, issued on Jan. 26, 1993 to Bikson, et al. and U.S. Pat. No. 5,871,680, issued on Feb. 16, 1999 to Macheras, et al. Porous hollow fiber substrates prepared by the dry-wet spinning process typically are washed prior to use. In a preferred embodiment of the invention, the impregnation fluid has the same chemical composition as the final washing liquid.

Alternatively, a dry porous substrate can be manufactured first and then impregnated with a controlled amount of impregnation fluid in a subsequent step that is not an integral part of the preparation process employed to fabricate the porous substrate. If the porous substrate is spun in a dry form or if the solvents are completely removed by drying during substrate preparation, the dry substrate is wetted out with an impregnation fluid prior to the coating step further described below. Optionally, the amount of the impregnation liquid in the wetted out substrate can then be further adjusted by controlled evaporation in an oven or by other means such as described above.

The porous substrate which is impregnated with the impregnation fluid and, optionally, pre-dried to partially remove impregnation fluid from its porous structure, is coated with a solution. The coating can be at one or both sides of a planar substrate. In the case of hollow fiber substrates, the coating can be at the bore side, outer surface or both. The solution includes a perfluorinated polymer, such as, for example, the perfluoropolymers described above, and a perfluorinated solvent.

Perfluorinated and quasi-perfluorinated solvents, which also are referred to herein as "perfluorinated", are preferred. Suitable solvents include, but are not limited to perfluoro (alkylamines), such as Fluorinert FC-40™ from 3M, perfluorotetrahydrofurans, such as Fluorinert FC-75™ from 3M, perfluoropolyethers, such as Galden HT 90, Galden HT110 and Galden HT-135 from Ausimont, and others.

The concentration of perfluoropolymer coating solutions is preferably below 3 grams (g)/100 cubic centimeters (cc), more preferably below 2 g/100 cc and most preferably below 1 g/100 cc.

The miscibility of the impregnation fluid in the solvent employed in the coating step preferably does not exceed about 15% by volume at room temperature conditions, i.e. 20° C. More preferably the miscibility is less than about 5% by volume at room temperature.

In one embodiment of the invention, the impregnation fluid is essentially immiscible with the solvent. By the term "essentially immiscible" it is meant that the rate of penetration of the solvent into the impregnation fluid is so slow as to limit occlusion of the solution into the porous substrate until the coating has solidified.

The porous substrate impregnated with impregnation fluid, can be coated with the solution including the perfluoropolymer and perfluorinated solvent in a coating and drying sequence. This coating and drying sequence includes passing the hollow fiber through the coating solution contained in a coating vessel or through a coating applicator followed by drying in an oven prior to the fiber being taken up on a winder or otherwise being processed or stored for eventual incorporation into modules suitable for commercial gas separation applications. Examples of an apparatus suitable for hollow fiber coating operations are described in U.S. Pat. No. 4,467,001 issued on Aug. 21, 1984 to Coplan, et al., the entire contents of which are incorporated herein by reference and European Patent Application EP 719581 published on Jul. 3, 1996. As discussed above, the coating and drying sequence can be preceded by partial pre-drying of the impregnated substrate.

In a preferred embodiment a porous hollow fiber substrate is formed by a dry-wet spinning process, the hollow fiber substrate is washed to remove residual solvent and pore former, the hollow fiber substrate is partially dried to remove the surface layer of the washing liquid, the hollow fiber substrate is coated with a dilute solution of amorphous perfluoropolymer in perfluorinated solvent and dried. In a particularly preferred embodiment of this invention, composite perfluoro-2,2-dimethyl-1,3-dioxole copolymer composite membranes are prepared by applying a coating solution of Teflon AF" polymer in a perfluorinated solvent to a porous polysulfone hollow fiber impregnated with a controlled amount of water to produce the composite membrane.

The process of the present invention results in coatings that are both thin and substantially free of defects. Composite membranes prepared by the method of the invention are less than about 1 μm thick, preferably less than 0.5 μm thick, most preferably less than 0.1 μm thick, non-occlusive coating layers over a substrate which, preferably, presents little resistance to gas flow. As a result, the gas separation factor of the composite membranes prepared by the method of the invention is close to the measured intrinsic gas separation factor of the coating material. In a preferred embodiment, the composite membranes prepared by the method of the invention have a perfluorinated polymeric coating which has a thickness between about 100 angstroms (Å) and about 2000 Å, preferably between about 150 Å and 1500 Å and most preferably between 150 Å and 500 Å.

The composite membranes fabricated by the method of the invention exhibit superior gas permeation characteristics as compared to prior art membranes. For example, composite perfluoropolymer hollow fiber membranes prepared by the method disclosed herein exhibit oxygen permeance above 1500 and often above $2,000 \times 10^{-6}$ cm$^3$(STP)/((cm$^2$)(sec)(cmHg)). The composite membranes formed by the method of the invention also are essentially defect free, i.e. exhibit $O_2/N_2$ gas separation factor of at least 2.1 and preferably at least 2.3. In one embodiment, the composite membranes fabricated by the method of the invention have an $O_2/N_2$ gas separation factor between about 2.3 and about 2.5. In comparison, existing perfluoropolymer membranes exhibit substantially lower oxygen gas permeance. In most cases, the oxygen permeance of existing perfluoropolymer is lower by a factor of 2 to 3 when compared to the oxygen permeance of the composite membranes prepared by the methods of the invention.

Composite membranes prepared by the method of the invention have been found to successfully withstand contact with contaminants such as, for example, hydrocarbon vapors and oxides of nitrogen, referred to herein as $NO_x$, found, for instance, in the exhaust fumes generated by combustion engines.

The mechanism that leads to the formation of the composite membranes of this invention is not fully understood. Without wishing to be bound by the exact mechanism of composite membrane formation, it is believed, however, that the unique performance of the membranes disclosed herein can be potentially attributed not only to the non-occlusive nature of the coating but also to the ability to preserve the high level of substrate's surface porosity throughout the composite membrane forming process. It is well known in the art that surface pores can collapse on drying, leading to a decrease in productivity, i.e. gas transport rates. The perfluoropolymers and solvents, and in particular the perfluorinated solvents employed in the methods of this invention exhibit low surface energy characteristics (e.g. 12–18 dynes/cm) and as such may minimize surface pore collapse during drying.

The membrane of the invention can be employed in processes for separating a fluid mixture into a fraction enriched in a component and a fraction depleted in that component. The fluid mixture can be gaseous, liquid or a gas-liquid combination. Specific examples include, but are not limited to, air, natural gas, hydrogen-containing gas streams and hydrocarbon gas mixtures. In a preferred embodiment the fluid mixture is air and the fast permeating component is oxygen.

Generally, to effect the separation, the fluid mixture is contacted with a composite membrane. Configurations having a bore side feed as well as configurations having a shell side feed can be employed, as known in the art. A portion of the fluid mixture preferentially permeates through the composite membrane thereby generating a fraction enriched in the component and a fraction depleted in that component.

For example, contacting an air stream with the feed side of the composite membrane of the invention generates a fraction having an oxygen content which is higher than the oxygen content present in air, for example, greater than about 25 volume percent and preferably greater than about 28 volume percent. Also generated is a fraction which has an oxygen content less than the oxygen content present in air, e.g., no higher than about 20 volume percent. As the major components of air are oxygen and nitrogen, the fraction depleted in oxygen is nitrogen-enriched in comparison to air. In a preferred embodiment of the invention, the fraction depleted in oxygen has a nitrogen content of at least about 80 volume percent.

The invention relates also to separation devices, and especially to gas separation devices, also referred to herein as separation cartridges or separation modules. In a preferred embodiment, the separation device includes a substrate constructed from polysulfone hollow fibers and coated with perfluoro-2,2-dimethyl-1,3-dioxole copolymers. Devices which include the composite membranes of the invention can be constructed by procedures disclosed, for example, in U.S. Pat. No. 3,755,034, issued in August 1973 to Mahon, et al.; U.S. Pat. No. 4,781,834, issued on Nov. 1, 1988 to Sekino, et al.; U.S. Pat. No. 5,837,033, issued on Nov. 17, 1998 to Giglia, et al.; U.S. Pat. No. 4,881,955, issued on Nov. 21, 1989 to Bikson, et al.; and U.S. Pat. No. 5,026,479, issued on Jun. 25, 1991 to Bikson, et al.

The separation modules of the present invention can be utilized in gas separation processes such as recovery of hydrogen from hydrogen containing streams, removal of acid gases from low grade natural gas, removal of hydrocarbons from air.

The flow configurations can include shell side and bore side feed configurations. Optionally, the separation modules of the invention can further employ a sweep stream, generally at the permeate side of the composite membrane. A bore side feed configuration and a bore side feed configuration that employs a sweep stream at the shell side are preferred. With respect to the direction of the feed stream, the sweep stream can be directed co-currently, at cross flow or countercurrently, with the countercurrent configuration being preferred. The module designs can further include axial and radial flow configurations, with axial countercurrent flow configurations being particularly preferred.

In one embodiment of the invention, the separation device preferably is cylindrical in shape and ranges in diameter from about 2 centimeters (cm) to about 50 cm or more, preferably from about 5 cm to about 30 cm and most preferably from about 10 cm to about 20 cm. The device has a length from about 10 cm to about 300 cm, preferably from about 30 cm to about 100 cm.

The optimal device diameter to length ratio can be selected based on specific needs of the separation application including permeate and feed side pressure drop requirements. The overall volume occupied by a preferred separation device of the invention, including its enclosure, can vary from about 10 cm$^3$ to about 200,000 cm$^3$ or more. For many commercial applications, the volume is at least 1000 cm$^3$, preferably above 5000 cm$^3$.

Figure 5:
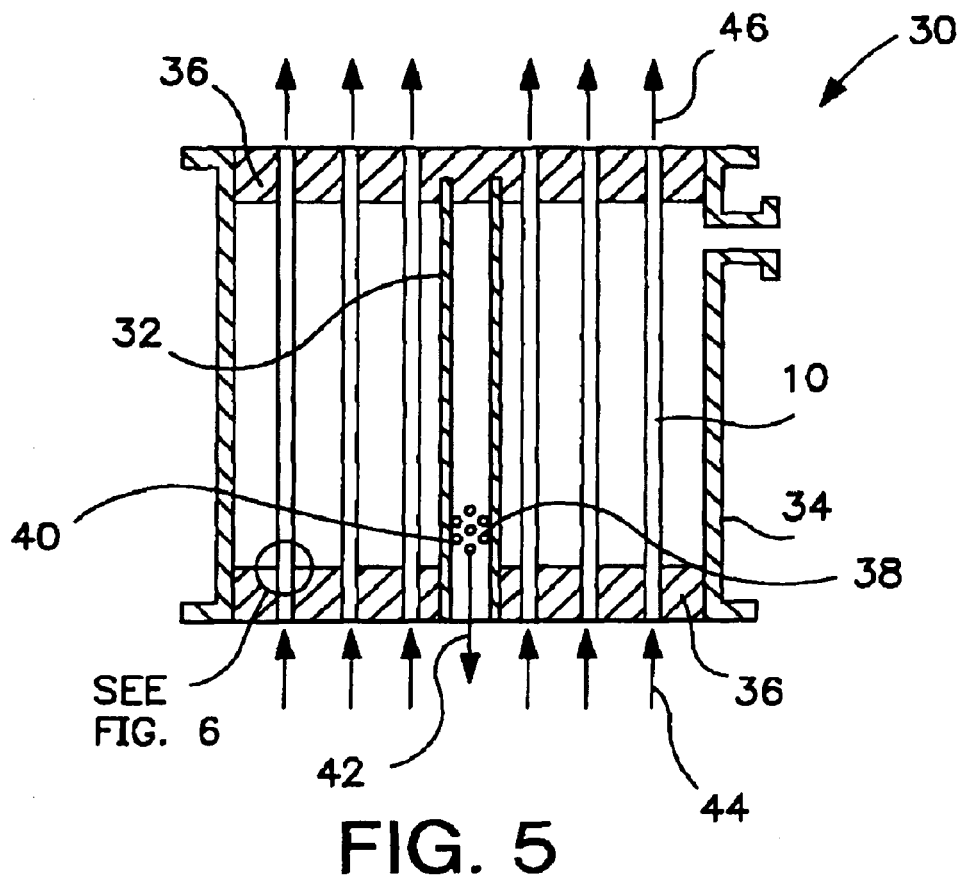
FIG. 5 is a sectional view of a module of the invention.

A particularly preferred separation module which includes air as the permeate side sweep and is suitable for producing a nitrogen-rich fraction from air is shown in FIG. 5. FIG. 5, not drawn to scale, is a sectional view of separation device 30 which includes composite membranes 10, arranged around central tubular core member 32 and positioned inside enclosure 34. The hollow fibers are sealed, for example with epoxy, in tubesheets 36 in fluid tight relationship with hollow fiber bores and in fluid communications with the compressed feed air port and the product nitrogen enriched air port (not shown). The enclosure contains an air sweep inlet port 38 that is in fluid communication through extraction holes 40 in core 32 with the combined permeate/sweep flow removal conduit 42 that in turn connects to the permeate/sweep discharge port (not shown). During operation, feed air is introduced through conduits 44 and the fraction which is nitrogen enriched air passes through conduits 46.

Figure 6:
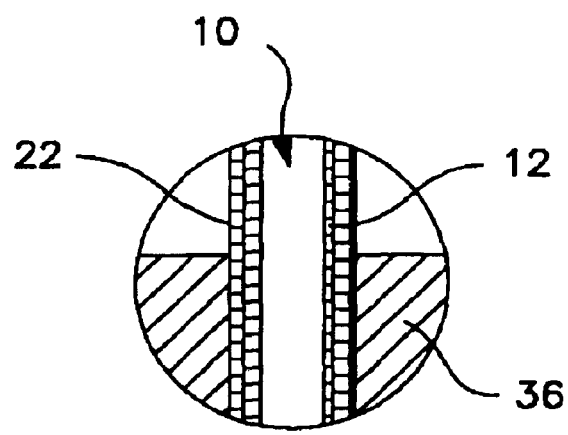
FIG. 6 is a detailed view of a portion of the module shown in FIG. 5.

FIG. 6, not drawn to scale, shows the enlarged longitudinal cross section of membrane 10, sealed in tubesheet 36. Membrane 10 includes substrate 12 and coating 22 and preferably is prepared by the method and has the characteristics described herein.

The membrane devices of present invention feature a large membrane gas transport area in a small volume. This feature is particularly advantageous for use with mobile engines, such as automotive internal combustion engines. The internal combustion engine includes any type of spark induced ignition or compression induced ignition engine which requires a combustible mixture of oxygen and fuel to operate.

In one embodiment of the invention, the high productivity, compact membrane device of this invention is employed to generate nitrogen enriched air, having an oxygen content of about 18–20 volume percent, from compressed air generated by an automotive turbo charger. The nitrogen enriched air can be then fed into the intake of a diesel engine to reduce NO$_x$ emissions. The use of conventional membrane devices to generate oxygen or nitrogen enriched air for use in conjunction with internal combustion engine is disclosed in U.S. Pat. No. 5,636,619, issued on Jun. 10, 1997 to Poola, et al.; U.S. Pat. No. 5,649,517, issued on Jul. 22, 1997 to Poola, et al.; U.S. Pat. No. 5,678,526, issued on Oct. 21, 1997 to Cullen, et al.; and U.S. Pat. No. 5,960,777, issued on Oct. 5, 1999 to Nemser, et al.

The membrane devices of this invention are further particularly useful in generating an oxygen enriched air stream having an oxygen content of about 28 to 32 volume percent. Such oxygen enriched air streams are particularly useful in combustion and fermentation applications.

The invention is further described through the following examples which are provided for illustrative purposes and are not intended to be limiting.

EXAMPLE 1

Preparation of Porous Hollow Fiber Substrate

A porous polysulfone hollow fiber substrate was prepared by a dry-wet spinning process from the following spinning solution: 34 wt % polysulfone Udel P3500, 22% Triton X-100 and 44% dimethylformamide (DMF). The prefiltered polysulfone solution was spun through a tube-in-orifice spinneret to produce the nascent hollow fiber. The spinneret was completely enclosed in a vacuum chamber in which the vacuum level was maintained at about 14 cm Hg. The spinning dope was extruded through the spinneret at a temperature of 71° C. while g-butyrolactone was delivered through the bore of the injection tube to produce a hollow filament stream in the vacuum chamber. The hollow filament stream traveled through the vacuum chamber for a distance of about 2 cm and was then coagulated in water maintained at about 32° C. and collected at a rate of about 17 meters per minute. The hollow fiber dimensions were about 0.102 cm outer diameter (OD) and 0.076 cm inner diameter (ID). The thus formed hollow fibers were first washed extensively with an isopropyl alcohol/water mixture (80/20 by volume) and then with a large excess of water. The hollow fibers were stored wet until their further use as a substrate in forming composite membranes. When dried, the hollow fibers had a helium permeance of $7.8 \times 10^{-2}$ cm$^3$ (STP)/cm$^2$ sec·cmHg and a N$_2$ permeance of $3.9 \times 10^{-2}$ cm$^3$ (STP)/cm$^2$·sec·cmHg with a selectivity of 2.0 for He/N$_2$.

EXAMPLES 2 THROUGH 5

Preparation of Composite Membranes

Composite membranes were prepared by coating polysulfone hollow fibers prepared as described in Example 1 with a solution of Teflon AF™1600 polymer (Du Pont) in Fluorinert-75 solvent. The concentrations of coating solutions are listed in Table 1.

The water saturated hollow fibers were pre-dried to different levels by passing the fibers through a drying oven maintained at 110° C. at the oven entrance and at 128° C. at the oven exit, respectively. The water content of the fiber was inversely proportional to the time spent in the drying tower. The hollow fiber substrate residence time in the drying oven was varied between 30 seconds and 75 seconds. The pre-dried polysulfone hollow fibers were coated by transporting the fibers through a coating solution, followed by drying in a second drying oven and then collected on a winder. Residence times in the predrying oven also are shown in Table 1.

The thus prepared composite hollow fibers were constructed into separation modules and tested for air separation performance with a compressed air feed at 274 KiloPascals (KPa) and ambient temperature and at a stage cut of less than 5%. The measured oxygen permeance and O$_2$/N$_2$ separation factors of the thus prepared composite membranes are summarized in Table 1.

TABLE 1

| Example No. | Conc. of Coating Solution (g/100 cc) | Substrate Residence Time in the Drying Oven (sec) | Permeance, $O_2$ $10^{-6}$ cm$^3$(STP)/ cm$^2$sec.cmHg | Separation Factor ($O_2/N_2$) |
|---|---|---|---|---|
| Example 2 | 2.0 | 30 | 266 | 2.1 |
| Example 3 | 2.0 | 75 | 143 | 2.2 |
| Example 4 | 1.0 | 30 | 450 | 2.3 |
| Example 5 | 1.0 | 75 | 266 | 2.2 |

EXAMPLE 6
Preparation of a Porous Hollow Fiber Substrate

The polysulfone hollow fiber substrate was prepared as described in Example 1 except that the spinning solution composition was 29 wt % polysulfone, Udel P3500, 22% Triton X-100 and 49% dimethylformamide (DMF) and the spinning solution was extruded through the spinneret at the temperature of 49° C. The hollow fiber dimensions were about 1100 microns OD and 800 microns ID. The thus prepared hollow fibers had helium permeance of $1.72 \times 10^{-1}$ cm$^3$ (STP)/cm$^2$·sec·cmHg and $N_2$ permeance of $9.05 \times 10^{-2}$ cm$^3$ (STP)/cm$^2$·sec·cmHg, with $He/N_2$ selectivity of 1.9.

EXAMPLES 7 THROUGH 8
Preparation of Composite Membranes

The composite hollow fiber membranes were prepared according to the procedure described in Examples 1–6 except that a higher permeability polysulfone hollow fiber substrate described in Example 6 was utilized. The measured oxygen permeance and $O_2/N_2$ separation factors of the thus prepared composite membranes are listed in Table 2.

TABLE 2

| Example No. | Conc. of Coating Solution (g/100 cc) | Substrate Residence Time in Drying Oven (sec) | Permeance, ($O_2$) $10^{-6}$ cm$^3$ (STP) /cm$^2$.sec.cmHg | Separation Factor ($O_2/N_2$) |
|---|---|---|---|---|
| Example 6 | 2.0 | 30 | 826 | 2.0 |
| Example 7 | 2.0 | 75 | 334 | 2.3 |

The examples demonstrate that the residence time in the substrate predrying oven, i.e. the water content of the substrate, effects the gas permeation characteristics of the composite membrane.

EXAMPLE 9
Preparation of Composite Membrane

A composite membrane was prepared by coating polysulfone hollow fibers prepared as described in example 6 with a solution of Teflon AF™ 1600 polymer in Fluorinert75 solvent. The membrane was prepared as described in Example 2 except that the concentration of the coating solution was 0.75 (g/100 cc) and the substrate residence time in the drying oven was 40 seconds.

The thus prepared composite hollow fibers were constructed into a separation module and tested for air separation performance. The measured oxygen permeance and the $O_2/N_2$ separation factor of the thus prepared composite membrane were as follows: the $O_2/N_2$ separation factor was 2.4 and the permeance of $O_2$ was $2450 \times 10^{-6}$ cm$^3$ (STP)/cm$^2$·sec·cmHg.

EXAMPLE 10
Membrane Gas Separation Device

A bore side feed hollow fiber membrane gas separation device was constructed essentially as described in U.S. Pat. No. 5,026,479. The composite hollow fiber membranes were prepared as described in example 9. They were wound into a cylindrical cartridge about 15 cm in diameter and 43 cm long. The cartridge contained 10 m$^2$ of membrane area and occupied only about 7600 cm$^3$ of volume. The advantages of the high productivity membrane device of this invention for nitrogen and oxygen enrichment from air are demonstrated in the following process examples:

EXAMPLE 11
Nitrogen Enrichment from Air

The membrane device of Example 10 can be advantageously utilized to generate nitrogen enriched air. The process simulations indicated that 280 normal cubic meter per hour (Nm$^3$/hr) of nitrogen enriched air (19.5% oxygen content) can be obtained by utilizing the membrane devices of the present invention when 330 Nm$^3$/hr of compressed air at 274 KPa and 50° C. are fed into the bore side of the device while 101 KPa pressure is maintained on the permeate side. The product nitrogen enriched air is collected at 270 KPa. Only 10 m$^2$ of membrane area that occupy only 7600 cm$^3$ of volume are required for the nitrogen enrichment process. The membrane device exhibits a high productivity per unit of volume combined with a low feed side pressure drop.

The nitrogen enriched air generated by the membrane device can be fed into the intake of a diesel engine to reduce $NO_x$ emissions.

EXAMPLE 12
Nitrogen Enrichment from Air with Permeate Side Sweep

The membrane device of Example 10 can be utilized to generate nitrogen enriched air from compressed air feed while advantageously employing permeate side air sweep. The process simulations indicated that 295 Nm$^3$/hr of nitrogen enriched air (19.0% oxygen content) can be obtained by utilizing the membrane device of the present invention when 345 Nm$^3$/hr of compressed air at 274 KPa pressure and 50° C. temperature are fed into the bore side of the device while 69 Nm$^3$/hr of air at 106 KPa are introduced counter currently through the permeate side of the device. The product nitrogen enriched air is collected at 269 KPa. Only 10 m$^2$ of membrane area that occupy 7600 cm$^3$ of volume are required for the nitrogen enrichment process. The nitrogen enriched air generated by the membrane device can be fed into the intake of a diesel engine to reduce $NO_x$ emissions.

EXAMPLE 13
Oxygen Enrichment from Air

The membrane device of Example 10 can be advantageously utilized to generate oxygen enriched air. The process simulations indicated that 27 Nm$^3$/hr of oxygen enriched air (32% oxygen content) can be generated as a product permeate gas by feeding 190 Nm³/hr of air at 115 KPa and 50° C. into the bores of the hollow fiber membrane device of this invention while a 19 KPa vacuum is generated on the membrane permeate side. To generate this volume of oxygen enriched product, 10 m² of membrane area are required that occupy only 7600 cm³ of volume. The membrane device exhibits high productivity per unit of volume while providing only a 5 KPa pressure drop across the feed side of the device. The oxygen enriched air can be utilized in combustion or fermentation applications.

Equivalents

Those skilled in the art will recognize, or be able to ascertain using no more than routine experimentation, many equivalents to the specific embodiments of the invention described specifically herein. Such equivalents are intended to be encompassed in the scope of the following claims.

What is claimed is:

1. A method for separating a fluid mixture into a fraction enriched in a first component and a fraction depleted in the first component, comprising the step of contacting a fluid mixture selected from the group consisting of natural gas-containing mixture, a hydrogen gas-containing mixture and a hydrocarbon gas-containing mixture with a composite membrane, said composite membrane having been formed by a process including the steps of:

(1) impregnating a porous substrate with an impregnation fluid that is essentially immiscible with a perfluorinated solvent;

(2) coating the impregnated porous substrate with a solution that includes a perfluoropolymer and the perfluorinated solvent; and (3) removing said perfluorinated solvent and the impregnation fluid to form a perfluorinated polymer coating on said porous substrate, thereby forming said composite membrane, whereby said fraction enriched in the first component and said fraction depleted in the first component are generated by preferentially permeating a portion of said fluid mixture through said composite membrane.

2. The method of claim 1, wherein the fluid mixture is a gas mixture.

3. The method of claim 2, wherein the porous substrate of said composite membrane is a hollow fiber having a bore side and an outer surface, wherein the perfluorinated coating is on either the bore side or the outer surface of said hollow fiber, or both.

4. The method of claim 3, wherein said gas mixture contacting said composite membrane is directed into the bore side of the hollow fiber.

5. The method of claim 3, wherein pores at the bore side of the porous substrate have an average diameter greater than pores at the outer surface of said porous substrate.

6. The method of claim 1, wherein the porous substrate of said composite membrane is a hollow fiber or a planar membrane.

7. The method of claim 6, wherein the porous substrate is symmetric.

8. The method of claim 1, wherein the first component is selected from the group consisting of methane, hydrogen and a hydrocarbon.

9. The method of claim 1, wherein the porous substrate is a polymeric substrate selected from the group consisting of polysulfones, polyethersulfones, polyolefins, polyetherimides, polyimides, polyvinylidene fluoride, polyacrylonitrile, polyphenylene oxide, polyethylenes, polypropylenes, cellulose acetates, ethylcellulose and mixtures thereof.

10. The method of claim 9, wherein the porous substrate includes polysulfone.

11. The method of claim 1, wherein the perfluoropolymer includes either a perfluoromethoxydioxole or a perfluoro-2,2-dimethyl-1,3-dioxole.

12. The method of claim 11, wherein the perfluoropolymer includes a copolymer of perfluoro-2,2-dimethyl-1,3-dioxole.

13. The method of claim 12, wherein the perfluoropolymer includes a copolymer of perfluoro-2,2-dimethyl-1,2-dioxole and tetrafluoroethylene.

14. The method of claim 1, wherein the impregnation fluid is selected from the group consisting of a hydrocarbon, an alcohol, water and any mixture thereof.

15. The method of claim 14, wherein the impregnation fluid is water.

16. The method of claim 1, wherein the perfluorinated solvent is selected from the group consisting of perfluoropolyethers, perfluoroalkylamines perfluorotetrahydrofurans and mixtures thereof.

17. The method of claim 16, wherein the perfluorinated solvent is perfluoro-n-butyl tetrahydrofuran.

18. The method of claim 1, wherein the impregnation fluid is at least partially removed from the impregnated porous substrate prior to coating.

* * * * *